Dec. 5, 1961    B. R. SMITH    3,011,521
VALVE

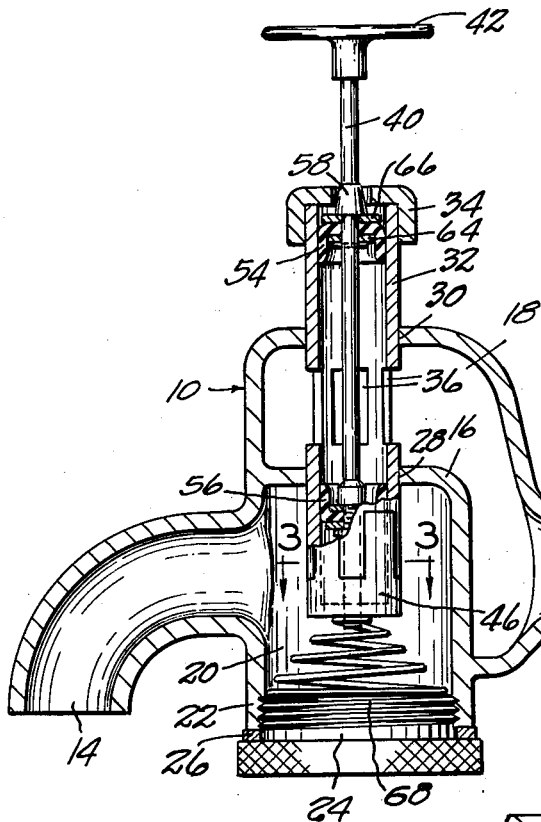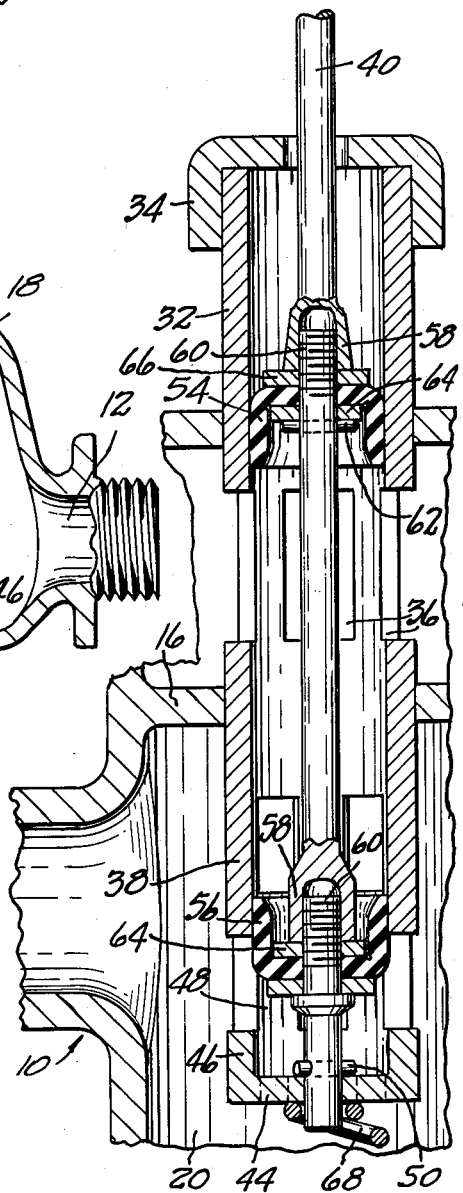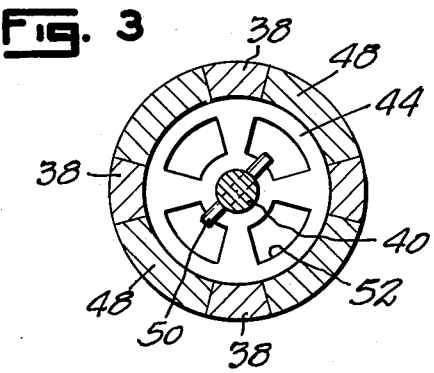
INVENTOR.
BUFORD R. SMITH

Filed Feb. 4, 1960    2 Sheets-Sheet 2

*INVENTOR.*
BUFORD R. SMITH
BY
Eugene C. Knoblock
ATTORNEY

United States Patent Office 3,011,521
Patented Dec. 5, 1961

3,011,521
VALVE
Buford R. Smith, 123 Oakley St., Mishawaka, Ind.
Filed Feb. 4, 1960, Ser. No. 6,715
10 Claims. (Cl. 137—625.37)

This invention relates to improvements in valves, and more particularly to valves of the faucet type.

The primary object of the invention is to provide a valve having a novel seal responsive to liquid pressure and effective to maintain a leak-free condition at both closed and open positions of the valve.

A further object is to provide a valve with inlet and outlet chambers and a tubular portion communicating with said inlet and outlet chambers, wherein a pair of seals are mounted on a shiftable actuator at opposite sides of the point of communication of said tube with said inlet chamber, whereby fluid under pressure acting on said seals balances said actuator, and wherein the seal located between said inlet and outlet chambers in the closed position of the valve is shiftable to a position to open said valve.

A further object is to provide a valve having a housing with inlet and outlet chambers, a tubular portion communicating with both chambers and having a toothed outlet end, a toothed spring-pressed guide in said outlet chamber interfitting with said tube teeth, and an actuator having a lost motion connection with said guide and mounting spaced seals located at opposite sides of the point of communication of said inlet chamber with said tubular member, one of said seals being located partly within the interfitting teeth adjacent the outlet end of said tube in the closed position thereof and being shiftable with said guide relative to said tube against the action of said spring to open said valve.

Other objects will be apparent from the following specification.

In the drawing:

FIG. 1 is an axial sectional view of the valve in its closed position;

FIG. 2 is a fragmentary axial sectional view of the valve in open position;

FIG. 3 is a transverse sectional view taken on line 3—3 of FIG. 1;

Figure 4:
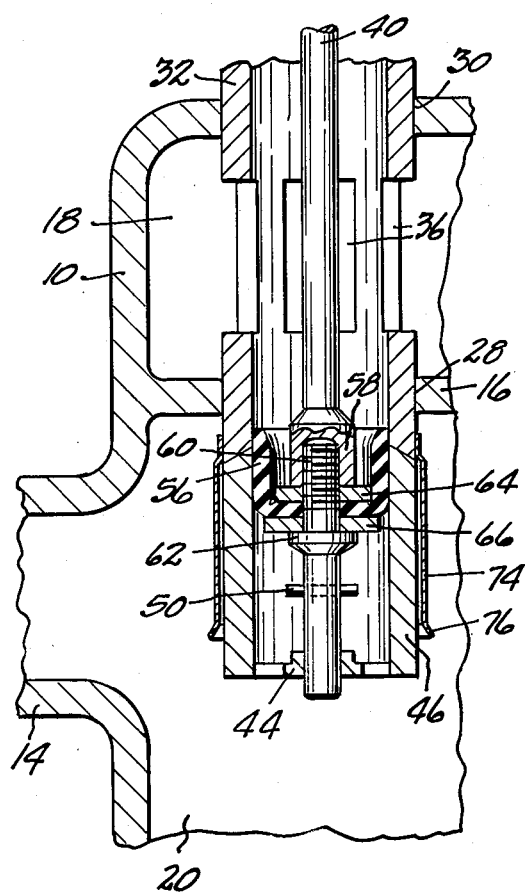
FIG. 4 is a fragmentary axial sectional view of a modified embodiment of the invention illustrated in valve closed position.

Referring to the drawing and particularly to FIGS. 1, 2 and 3 which illustrate one embodiment of the invention, the numeral 10 designates the housing or casing of a valve having a tubular inlet 12 and a tubular outlet 14. A wall or partition 16 is preferably interposed between said inlet and said outlet to define an inlet chamber 18 and an outlet chamber 20 in said valve housing. A tubular projecting portion 22 of the casing communicates with the outlet chamber 20, preferably in depending relation thereto, and a screw-threaded plug 24 is mounted in said projected portion 22 with a screw-threaded fit and is provided with an enlarged outer portion providing a shoulder seating an annular gasket 26 adapted to bear against the free outer end of the tubular portion 22.

A partition 16 has an aperture 28 formed therein preferably substantially coaxial with the housing portion 22 and an aperture 30 is formed in the outer wall of the valve housing 10 axially aligned with the aperture 28 and preferably of the same size. A tubular member 32 is mounted in the apertures 28 and 30 and is welded, soldered or otherwise fixedly secured in each of said openings with a sealed joint. The tube 32 projects outwardly from the valve housing 10 and terminates in an outer screw-threaded end portion mounting a cap member 34 having a central aperture therein. The intermediate portion of the tube 32 has a plurality of apertures 36 therein communicating with the inlet chamber 18. The inner end of the tube 32 projects into the outlet chamber 20 to terminate spaced from the partition 16 and from the closure plug 24 and is preferably provided with a plurality of circumferentially spaced elongated longitudinally extending tooth members 38.

A combined valve-actuating and sealing unit is shiftable in the tube 32. This unit includes an elongated valve stem 40 of a length greater than the length of the tube 32 and projecting at one end through the opening in the cap 34 and mounting a knob or presser member 42 at its outer end. A cup-shaped guide member has an apertured base 44 and an annular skirt portion 46. The skirt 46 is slotted to provide teeth 48 mating with the teeth 38 and adapted to interfit in interdigital relation therewith. The base 44 of the cup-shaped member is preferably apertured to slidably receive the inner end of the stem 40, and a cross-pin or other abutment member 50 is carried by the stem to bear against the inner surface of the wall 44, as best seen in FIG. 2. Also, if desired, the base 44 may be apertured at 52, as illustrated in FIG. 3.

A pair of spaced sealing members are fixedly mounted upon the stem 40 in predetermined relation. As here illustrated, an outer sealing member 54 is mounted on the stem to be positioned between the cap 34 and the tube apertures 36 and a seal 56 is mounted on the stem to be positioned in engagement with the teeth 38 and to project slightly above said teeth 38 in the closed position of the valve, as illustrated in FIG. 1. The seals 54 and 56 are preferably similar in construction and each preferably constitutes a cup-shaped sealing member, such as a cup leather or washer encircling the stem 40 with its annular or skirt portion extending in the direction of the other seal, that is, in the direction of the apertures 36. Any suitable means is provided for mounting the cup leathers or washers in selected position. As illustrated in FIG. 2, the stem 40 may be sectional, with one section including a screw-threaded socket member 58 receiving a screw-threaded stem portion 60 projecting from an enlargement or abutment 62 on the other stem section. The cup leather has an apertured base fitting snugly around the projection 60 and preferably clamped between an inner washer 64 interposed between the shoulder or abutment 62 and the base of the cup leather and an outer washer 66 interposed between the end of the socket 58 and the outer surface of the base of the cup leather.

A spring 68, such as a helical spring as shown, bears against the plug 24 and against the base 44 of the guide member on the inner end of the actuator and serves to normally urge the guide in interdigital end abutment with the toothed end of tube 32, as illustrated in FIG. 1. The removable abutment for the spring provided by the plug 24, coupled with a removable mounting of the presser member 42 upon the opposite end of the stem 40, accommodates removal of the stem 40, the seals 54 and 56 and the guide member 44, 46 as a unit.

It will be observed that fluid under pressure entering the inlet chamber 18 through the inlet passage 12 is free to enter the tube 32 through the passages or apertures 36 and to fill the portions of said tube between the seals 54 and 56. Since the seals 54 and 56 are preferably similar and face in the direction of each other, the fluid pressure exerted thereagainst acts to maintain the same in sealing contact with the mounting tube 32. The cross-sectional areas of the seals 54 and 56 will be equal so that fluid pressure operating in opposite directions thereagainst will produce a static and balanced pressure condition within the portion of the tube 32 between said seals. Consequently, the strength of the spring 68 need only be such as to support the weight of the actuating and sealing unit and provide such resistance to opening of the valve by pressing upon the presser 42 as may be desired. It will be understood, of course, that the spring pressure exerted by the spring 68 may be sufficient to return the guide 44, 46 to end abutment with the toothed end of tube 32.

Upon the application of downward or inward pressure to the member 42, the stem 40 is moved endwise and inwardly of the valve. As the stem 50 is shifted endwise it carries the seals 54 and 56 therewith sliding within the tube 32. After initial lost motion, the abutment 50 engages the base 44 of the toothed guide, whereupon the seal 56 and the guide move together to expose and progressively open the slots between the teeth 38 and thus open the interior of the tube 32 into communication with the outlet chamber 20 for liquid flow through the valve. The rate or extent of liquid flow will be modulated or controlled by the extent to which the lower or inner seal 56 is moved clear of the inner or upper ends of the slots of the tube 32 between the teeth 38. The teeth 38 and 48 will preferably be of sufficient length to permit the cup seal 56 to be confined and retained thereby when the valve is in fully open position. Consequently, as the seal 56 is subjected to the radially outwardly distending pressure of the liquid, it is encircled and supported substantially continuously circumferentially to insure against cutting, nibbling or injury thereto and to its edge as it moves and even as it reaches and passes the inner ends of the notches between the teeth 38 in movement to closed position. The final closing movement of the seal 56 is accommodated by lost motion between stem 40 and guide 44, which permits the stem to move the free lip of seal 56 into the solid part of the tube above the teeth 38 after the guide 44 seats against the inner end of the tube.

Figure 5:
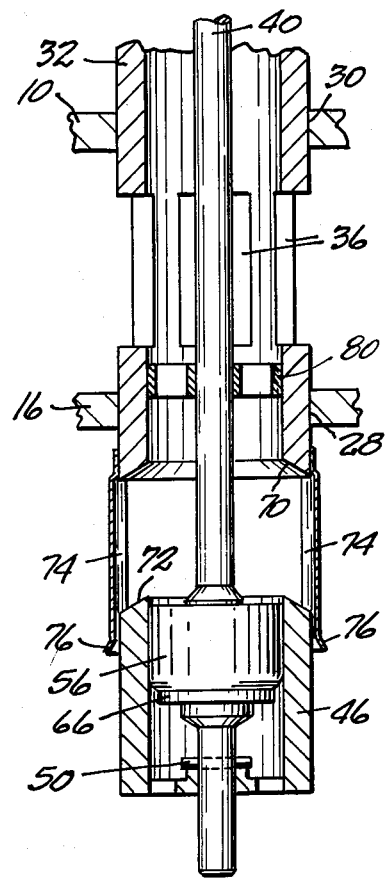
FIG. 5 is a fragmentary sectional view of the embodiment of the valve illustrated in FIG. 4, shown in open position.

A modified embodiment of the invention is illustrated in FIGS. 4 and 5 wherein the provision of interdigital fingers 38 and 48 upon the tube 32 and guide member 44, 46 is eliminated. In FIGS. 4 and 5 the reference numerals employed designate the same parts as in the previous embodiment.

In this embodiment, the tube 32 has a continuous beveled free lower edge 70 and the free upper edge of the skirt portion 46 of the guide member is continuous and beveled at 72 complementary to the bevel 70 to interfit and mate therewith. The tube bevel 70 extends within the outline of the tube 32 and the bevel 72 provides an outwardly facing taper on the free margin of the skirt portion 46. Initial movement of stem 40 toward open position occurs with lost motion relative to guide 46 so as to position the seal within said guide. The throw of the valve stem endwise required to fully open the valve is small because of the elimination of the teeth 38 and 48 used in the FIG. 1 form. The bevel 70 provides a guide leading or directing the free beveled edge 72 of the guide into register with the tube 32 so that the cup-shaped sealing member 56 may then be advanced into the interior of the tube 32 to reclose the valve after the guide abuts the tube. The fact that the sealing element 56 and guide 44 completely disengage the tube 32 necessitates the provision of means for guiding the stem 40 in its lengthwise movement between open and closed position. One means for this purpose is illustrated in FIG. 4 and constitutes the provision of longitudinally extending guide fingers 74 carried by the tube 32 and projecting from the free end thereof and preferably outturned at 76 to be engaged by the bevel 72 of the skirt 46 if said skirt portion is projected beyond the ends of the fingers and upon reclosing action is disaligned with or eccentric of the tube 32. An alternate guide means is illustrated in FIG. 5 and constitutes a spider member 80 mounted in the tube 32 between the apertures 36 thereof and the sealing position of the lower sealing member 56 in tube 32, said spider being centrally apertured to slidably receive the stem 40.

While the preferred embodiments of the invention have been illustrated and described, it will be understood that changes in the construction may be made within the scope of the appended claims without departing from the spirit of the invention.

I claim:

1. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, and spring-pressed shiftable means for confining said last named seal in said flow-accommodating position.

2. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, seal confining means shiftable in said outlet chamber by said stem and spring means urging said stem and seals to closed position and normally urging said seal confining means in end abutment with said tube.

3. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, and a guide slidably mounted on the end of said stem located within said outlet chamber and receiving said last named seal, means on said stem limiting the sliding movement of said guide, and means biasing said guide so that it seats against the end of said tube in the closed position of said valve stem.

4. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, a guide slidably mounted on the inner end of said stem and engaging the inner end of said tube in the closed position of said valve stem, means on said stem limiting the sliding movement of said guide, said guide receiving said last named seal in open position, and a spring pressing said guide toward said tube.

5. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, the end of said tube within said outlet chamber having longitudinally projecting circumferentially spaced teeth confining the adjacent seal when said valve is in open position and spring-urged shiftable means cooperating with said teeth for confining the adjacent seal when said valve is in open position.

6. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, the end of said tube within said outlet chamber having longitudinally projecting circumferentially spaced teeth separated by notches, said teeth confining the adjacent seal when said valve is in open position, a guide slidably mounted on the inner end of said stem and adapted to receive said last named seal in open position, means on said stem limiting the sliding movement of said guide, and a spring pressing said guide against said teeth.

7. A valve comprising a casing, a partition dividing said casing into intake and outlet chambers, a tube carried by said casing and extending through said intake chamber, one end of said tube terminating in said outlet chamber, an aperture in said tube open at said inlet chamber, a valve stem shiftable endwise in said tube and a pair of spaced seals carried by said stem, said seals spanning said tube at opposite ends thereof and at opposite sides of said tube aperture in closed position thereof, said stem being shiftable to a position in which the seal adjacent said outlet chamber accommodates flow of fluid through said tube from said aperture to said outlet chamber, said seals constituting cup washers having skirt portions extending toward each other and means shiftable relative to said tube in said outlet chamber for confining the seal adjacent said outlet chamber in the flow-accommodating position of said stem.

8. A valve comprising a casing, a partition dividing said casing into inlet and outlet chambers, a tube carried by said casing and extending through said inlet chamber with its inner end terminating in said outlet chamber, said tube having an aperture communicating with said inlet chamber, a stem shiftable endwise in said tube, spring means urging said stem to a closed position, a seal carried by said stem spanning the portion of said tube between said aperture and the end of said tube remote from said outlet chamber, a second seal spanning the portion of said tube between said aperture and its inner end in the closed position of the valve, said last named seal being shiftabel to open the inner end of said tube, and spring-urged means shiftable in said outlet chamber by said stem and relative to said tube for confining said last named seal in open position.

9. A valve comprising a casing, a partition dividing said casing into inlet and outlet chambers, a tube carried by said casing and extending through said inlet chamber with its inner end terminating in said outlet chamber, said tube having an aperture communicating with said inlet chamber, a stem shiftable endwise in said tube, spring means urging said stem to a closed position, a seal between said aperture and one end of said tube, and a second seal carried by said stem and spanning the portion of said tube between said aperture and its inner end in the closed position of the valve, said last named seal being shiftable to open the inner end of said tube, and spring-urged means slidable in said outlet chamber by said stem for encircling and confining said last named seal in the open position of said valve.

10. A valve comprising a casing, a partition dividing said casing into inlet and outlet chambers, a tube carried by said casing and extending through said inlet chamber with its inner end terminating in said outlet chamber, said tube having an aperture communicating with said inlet chamber, a stem shiftable endwise in said tube, spring means urging said stem to a closed position, a seal carried by said stem spanning the portion of said tube between said aperture and one end of said tube in all positions of said stem, a second seal spanning the portion of said tube between said aperture and its inner end in the closed position of the valve, said last named seal being shiftable to open the inner end of said tube, and means normally spring-pressed against said tube and shiftable by said stem for encircling said second seal in open position, said seals being similar and applying opposed balancing fluid pressure generated forces on said stem.

References Cited in the file of this patent

UNITED STATES PATENTS

| | | |
|---|---|---|
| 605,049 | Nichlosburg | May 31, 1898 |
| 1,157,215 | Gille | Oct. 19, 1915 |
| 1,164,600 | Forster | Dec. 14, 1915 |
| 1,660,777 | Allen | Feb. 28, 1928 |